US005280531A

United States Patent [19]

Hunter

[11] Patent Number: 5,280,531

[45] Date of Patent: Jan. 18, 1994

[54] APPARATUS FOR THE ANALYSIS OF POSTAGE METER USAGE

[75] Inventor: Kevin D. Hunter, Stratford, Conn.

[73] Assignee: Pitney Bowes Inc., Stamford, Conn.

[21] Appl. No.: 783,805

[22] Filed: Oct. 28, 1991

[51] Int. Cl.[5] .............................................. G06K 9/00

[52] U.S. Cl. .................................. 382/1; 364/464.02; 364/464.03; 382/57

[58] Field of Search ................................ 382/1, 57, 7; 364/464.02, 464.03; 235/375, 381; 380/55

[56] References Cited

U.S. PATENT DOCUMENTS

| | | | |
|---|---|---|---|
| 4,780,835 | 10/1988 | Sievel et al. | 364/464.02 |
| 4,888,803 | 12/1989 | Pastor | 364/464.02 |
| 4,907,161 | 3/1990 | Sansone et al. | 235/375 |
| 4,908,770 | 3/1990 | Breault et al. | 364/464.02 |
| 4,934,846 | 6/1990 | Gilham | 382/57 |
| 4,958,291 | 9/1990 | Mamone et al. | 364/464.02 |
| 4,962,459 | 10/1990 | Mallozzi et al. | 364/464.02 |
| 5,157,616 | 10/1992 | Haug | 364/464.02 |

*Primary Examiner*—Joseph Mancuso
*Attorney, Agent, or Firm*—Robert H. Whisker; Melvin J. Scolnick

[57] ABSTRACT

A method and system for analyzing the usage of postage meters with respect to the history of meter recharges for the purpose ,of detecting fraudulent or improper usage of the meters. The apparatus includes an optical character recognition system which scans mail pieces in a stream of mail pieces to recognize postage amounts and meter identification numbers imprinted on the mail pieces. The apparatus also includes inputs for input of data representing the recharge history for postage meters which correspond to authorized identification numbers and thresholds, i.e. parameters against which expenditures and the refill history of a particular meter will be tested. A data processing system compares cumulative amounts of postage expended by a particular meter to determine if the difference between totals expended and total recharges exceeds the thresholds, indicating the possibility of fraudulent or improper use of that meter. When such possible fraudulent or improper use is detected the apparatus diverts the suspect mail pieces from the mail stream. In one embodiment the apparatus may include an input for input of particular meter identification number to be diverted. In another embodiment the apparatus may check for incorrect dates on mail pieces.

18 Claims, 4 Drawing Sheets

APPARATUS FOR THE ANALYSIS OF POSTAGE METER USAGE

BACKGROUND OF THE INVENTION

This invention relates to postage meters. More particularly, it relates to a method and apparatus for analyzing the usage of postage meters with respect to the history of meter recharges, for the purpose of detecting fraudulent or improper usage.

Postage meters are devices for printing indicia representative of selected amounts of postage on mail pieces. Such meters account for the total postage printed and will not print indicia if that total exceeds a predetermined amount. Typically, from time to time a postage meter is taken to a post office and there, upon payment to the postal service, the meter is "recharged" (sometimes hereinafter "refilled") so that the user can continue printing postal indicia. Alternatively, the meter may be recharged remotely at the user's location over the telephone network by use of a service such as that marketed by the assignee of the subject application under the trademark "Postage-by-Phone". Thus, it can be seen that, in essence, a postage meter is a device for printing postage stamps; constructed in a manner to assure that all the "stamps" used are paid for. Thus, postage meters are designed and constructed so that each postage amount printed is accounted for, and so that the meter can only be recharged upon proper payment. A postage meter is also designed and constructed so that any attempts to defeat the safeguards designed into the meter are easily detected.

One method to overcome the safeguards incorporated in postage meters is to produce counterfeit indicia. To prevent this postage meter indicia are design in an arbitrary and fanciful manner so that they are not easily duplicated and may include "tells", small variations in the design of the indicia from meter to meter, to help a skilled inspector to detect counterfeit indicia. However, when we consider that postage meter indicia, on average, represent relatively low dollar values and that postage meters for printing indicia are located at hundreds of thousands of locations, and the continuing inability of the government to prevent counterfeiting of currency, which has a much greater value then the average postage meter indicia and is much more carefully produced, it is clear that these techniques cannot provide complete assurance against the production of counterfeit postage meter indicia.

Presently the only other methods available to detect the use of counterfeit postage meter indicia is to inspect the mailstream, determine the cumulative total of postage preportedly printed by a given postage meter, and compare this to the recharge history of that meter; or to check the serial number printed in all meter indicia. Currently these methods can only be done manually and are thus difficult and expensive and are rarely, if ever, done. (In the United States mailers are required to post metered mail at a Post Office specifically designated for each postage meter. Thus, an incorrect serial number may indicate a counterfeit indicia.)

Thus, it is an object of the subject invention to provide a method and apparatus for efficient and low cost comparison of the total postage expended by a particular postage meter with the recharge history of that meter.

BRIEF SUMMARY OF THE INVENTION

The above object is achieved and the disadvantages of the prior art are overcome in accordance with the subject invention by means of a method and system for the analysis of postal indicia printed by a postage meter. An optical character recognition system scans a mail piece from a stream of mail pieces to recognize a postage amount and a meter identification number imprinted on the mail piece. The subject invention also includes an input for input of data representing the recharge history for a postage meter which corresponds to the identification number, and a data processing system for controlling the system and implementing the method of the subject invention. The data processing system responds to the optical character recognition system and to the input to accumulate the postage amount in a first record associated with the identification number, store the recharge history in a second record associated with the identification number, compare the first and second records, and if the comparison of the first and second records shows a likelihood of unauthorized use of the postage meter, generate a discrepancy report.

Thus, it can be seen that the subject invention achieves the above object and advantageously overcomes the problems of the prior art. Other objects and advantages of the subject invention will be apparent to those skilled in the art from the detailed description set forth below and from the attached drawings.

DETAILED DESCRIPTION OF PREFERRED EMBODIMENTS OF THE INVENTION

Figure 1:
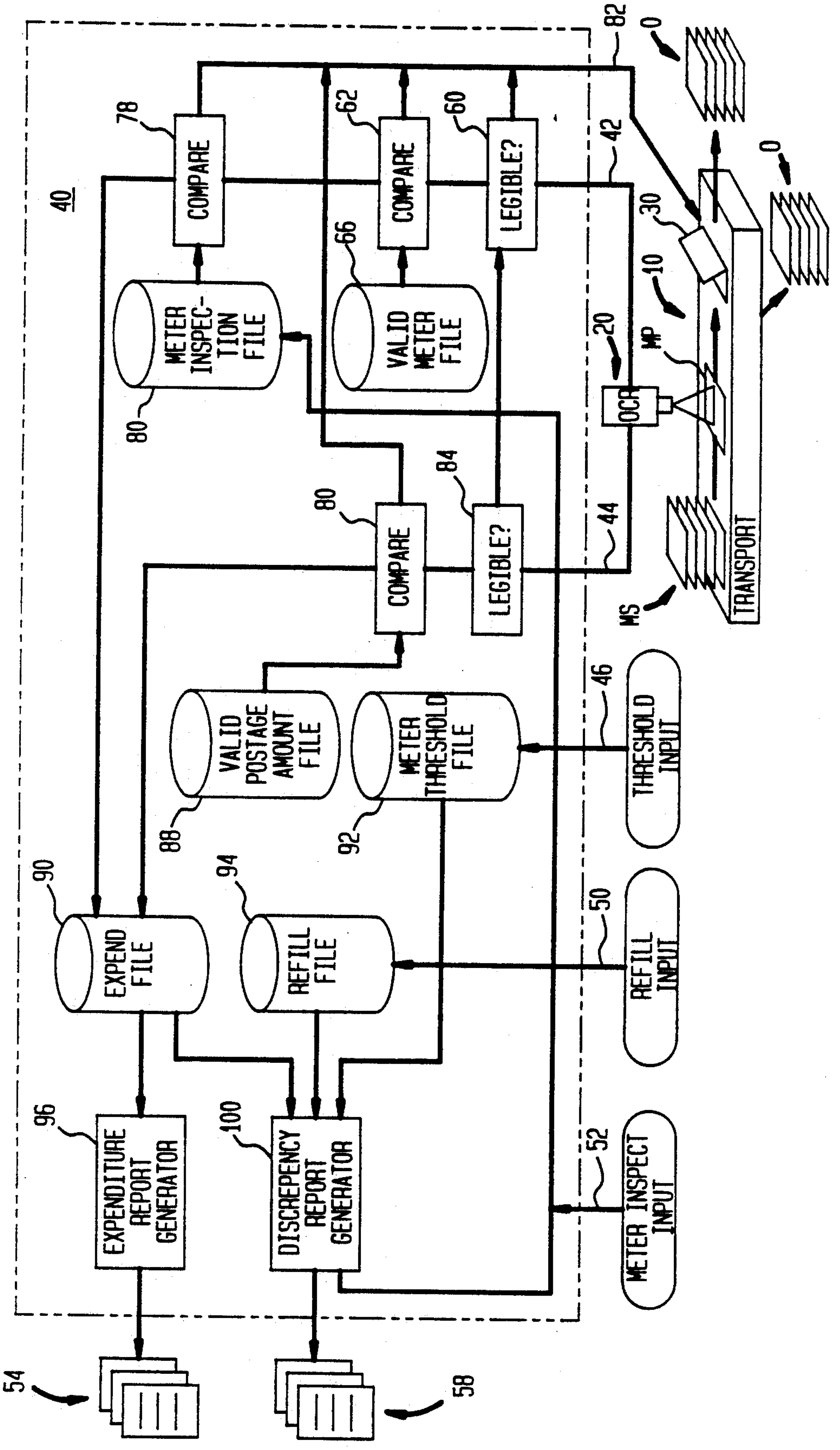
FIG. 1 shows a schematic block diagram of a system in accordance with the subject invention.

FIG. 1 shows a schematic block diagram of a system in accordance with the subject invention. A conventional transport system 10 singulates a mailstream MS and transports mail pieces MP past a conventional OCR system 20. Transport 10 is substantially a conventional device, well known in the art, and may be either a stand alone unit or may be incorporated into existing mail processing equipments such as facer-cancellers marketed by the assignee of the present application.

As each mail piece is transported past OCR system 20 the postal indicia (not shown) is scanned in a conventional manner to read at least the postage amount and the meter identification number which are incorporated in all postal indicia produced by postage meters in accordance with the Domestic Mail Manual of the U.S. Postal Service. OCR scanning is a conventional, well known technique used, for example, to process hundreds of millions of credit card slips each year. Accordingly, it is believed that a further description of OCR techniques is not necessary for an understanding of the subject invention, and no further description will be provided, except to note that since postal indicia are printed in fluorescent inks, it is preferable to scan the postal indicia in the ultra violet range to improve the foreground/background separation, and to aid in distinguishing postal indicia from various other graphics which may be printed on a mail piece.

Transport 10 also includes diverter mechanism 30 which separates mailstream MS into output O and a diverted output D, which consists of mail pieces which require manual inspection, as will be described further below.

OCR 20 is connected to data processing system 40 in a conventional manner and provides an output 42 representative of the meter identification number and an output 44 representative of the postage amount to system 40.

(Those skilled in the art will recognize that connecting lines in FIG. 1 represent data flows and do not necessarily correspond to physical signal connections. For example, generally only a single signal connection would be made between OCR 20 and data processing system 40. Actual signal connections would be determined by the choice of OCR 20 and data processing system 40 and could readily be implemented by a person skilled in the art. A suitable data processing system and a suitable OCR system can readily be selected by a person skilled in the art based on anticipated mail volumes and desired scanning rates and accuracy.

Other inputs to data processing system 40 are threshold input 46 which inputs parameters against which the expenditures and refill history of a particular meter will be tested, refill input 50 which inputs the refill history of particular meters, and meter inspection input 52 which inputs meter identification numbers which require manual inspection, as will be described below.

Data processing system 40 produces expenditure reports 54, which describe the expenditures of particular meters as identified by the meter identification number in the postal indicia, and discrepancy reports 58 which identify those meters where expenditures differ from what would expected in light of the refill history by more than a predetermined threshold, as will be described further below. Those skilled in the art will recognize that while reports 54 and 58 are shown as printed documents they may also be generated as electronic signals for transmission to remote locations or on magnetic media such as floppy disk or magnetic tape without departing from the spirit of the subject invention.

Returning to input 42, OCR 20 may input the digits of the meter identification number in any of a number of conventional manners. (It should be noted that since the information to be identified consists only of numerals in a limited selection of type styles the character recognition task in the subject invention is highly simplified. The task is also simplified in that localing the relevant information, postage amount and serial number is made easier by the case of fluorescent inks, and the fact that relatively few types of meters, having highly distinctive indicia, are in use; making it simpler to identify the indicia format and locate the information needed. Postal Services would also require indicia to include easily recognizable fiducial marks to locate the information.) System 20 may output a value from zero through nine or a signal indicating that a digit is unrecognizable, may output a digit value together with an estimate of likelihood, may output a number of values for each digit in the order of likelihood, or may output the scanned image, either with or without preprocessing to data processing system for recognition by data processing system 40. Each of these forms of output are conventional and may be implemented without departed from the spirit of the subject invention. In the preferred embodiment shown OCR system 20 will be assumed to output a first and second choice for each digit together with a likelihood for each choice. Data processing system 40 then applies a routine 60 to determine if the meter identification number is legible, that is if each digit is recognized with a sufficiently high likelihood; then applies a routine 62 to test the meter identification number against valid meter file 66 which identifies those meters which are authorized to deposit mail at a particular post office; and then tests the meter identification number against meter inspection file 80 which identifies those meter identification numbers which require inspection of the mail piece.

If the meter identification number is illegible, does not compare to valid meter file 66, or compares to meter inspection file 80, data processing system 40 asserts output 82 to control diverter mechanism 30 to divert the corresponding mail piece MP for inspection.

Input 44, corresponding to the postal amount is tested for legibility by routine 84 and preferably is compared by routine 86 to a valid postage amount file 88.

Comparison of the identified postage amounts with valid postage amounts is particularly useful in applications where mail stream consist only of a particular class of mail since that will greatly limit the number of different possible postage amounts which can be validly used.

Again, if the postage amount is not legible or does not compare to a valid postage amount, mail piece MP is diverted for manual inspection.

Assuming that input 42, the meter identification number, and input 44, the postage amount, are legible and pass all comparisons the postage amount is accumulated in a record associated with the identified meter in expenditure file 90.

Refill file 94 contains corresponding records of the refill history for the corresponding meters which is updated by refill input 50.

Periodically expenditure report generator 96 accesses expenditure file 90 to generate expenditure reports 54 for meters corresponding to the recognized meter identification numbers. Similarly discrepancy report generator 100 accesses expenditure file 90 refill file 94 and meter threshold file 92 to generate discrepancy reports 58 for those meters where the expenditure records are inconsistent with the corresponding refill record to an extent which exceeds predetermine threshold stored in meter threshold file 92.

Use of non-zero thresholds is preferred in the subject invention since delays in updating refill file 94 and/or errors in expenditure file 90 may result in inconsistencies between files 90 and 94 which are not indicative of improper or unauthorized use of the corresponding postage meter. Preferably these files will vary for particular meters. For example, larger discrepancies would be expected in regard to a meter used in a production mail operation (e.g. a credit card billing operation) as oppose to a meter used by a small business. Similarly, larger discrepancies would be expected in regard to a meter which is incorporated in a mailing machine as oppose to a low end, free-standing postage meter. In other embodiments of the subject invention the thresholds may vary as a function of time and/or the usage history of a postage meter.

In general three principles govern development of an algorithm for the comparison of expenditure file 90 with refill file 94. First, total expenditures which are greater than the total amount by which a meter has been recharged indicate the likelyhood of meter fraud. Second, since it may be assumed that meter users do not wish to tie up their money unnecessarily in a postage meter, total refill amounts which greatly exceed total expenditures indicate the possibility of improper use of a postage meter; particularly that mail generated by that meter is not being deposited at the appropriate post office. (The Domestic Mail Manual requires that mail produced by a postage meter be deposited at a single particular post office.) Third, because of delays in inputting updates of the meter recharge history, errors in expenditure records because of errors in scanning or for other reasons, uncertainties as to residual amounts charged in a postage meter when that meter is first incorporated into the system of the subject invention, and other similar uncertainties, it is preferable that any algorithm include thresholds which allow limited discrepancies between expenditure file 90 and refill file 94 in order to provide for efficient operation. Bearing these three principles in mind a person of ordinary skill in the art will be able to develop efficient algorithms for comparing expenditure files 90 and refill files 94 to detect likely unauthorized or improper use of postage meters. Beyond this the particular form of the algorithm taken forms no part of the subject invention and need not be discussed further here for an understanding of the subject invention. In this regard it should be remembered that the purpose of the subject invention is neither to prove conclusively improper usage of a postage meter, but only to detect the likelihood of such improper usage so that further investigation may be made and to facilitate investigation by providing an automatic outsort capability; nor to detect every instance of improper usage. Thus, appropriate choice of algorithms will depend upon trade-offs between efficiency and accuracy of detection and will depend upon the values and experience of users of the subject invention, and can best be developed by routine experimentation in light of that experience.

Data processing system 40 implements the above described operations by means of a control, or main line program which will be describe below with respect to FIGS. 2 through 4.

Figure 2:
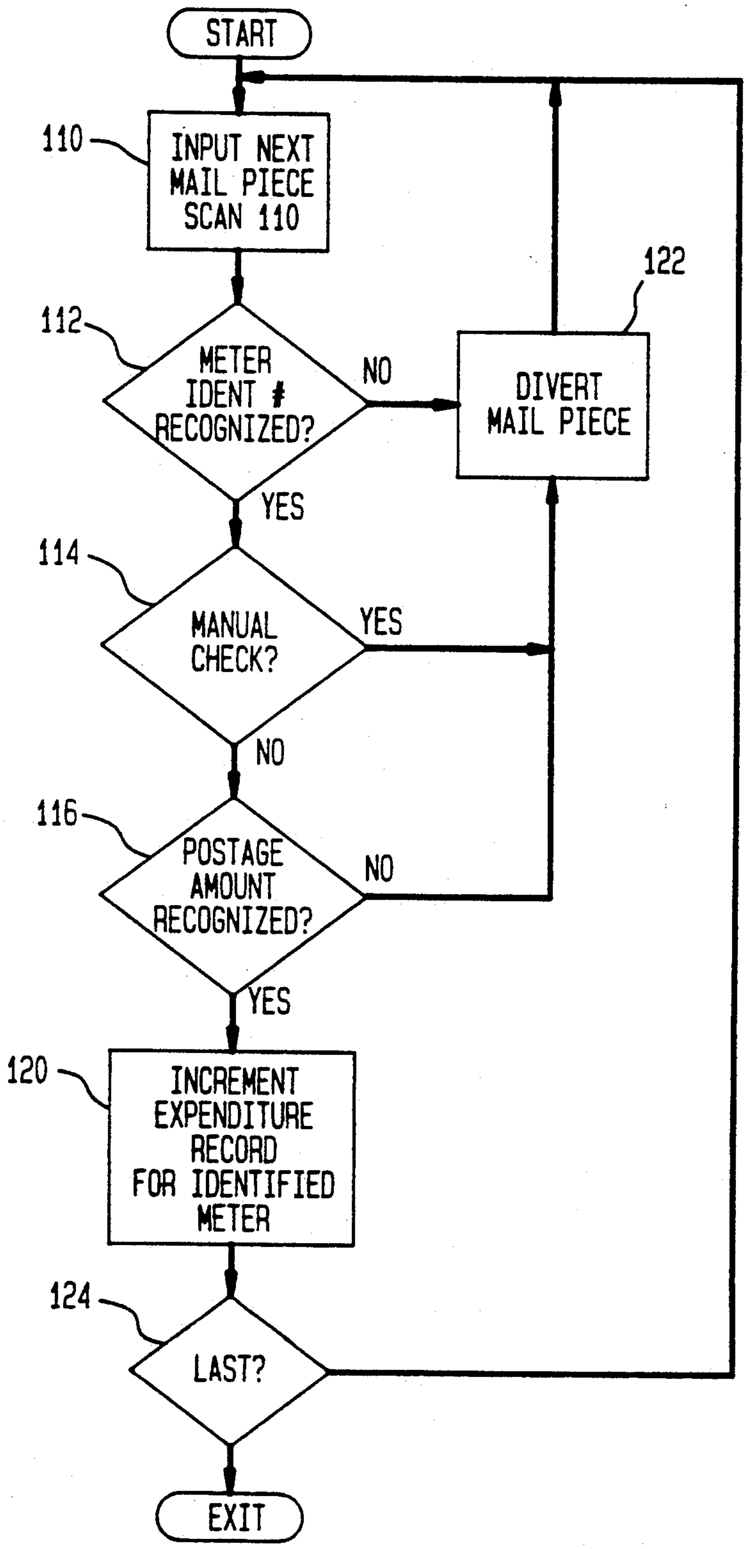
FIG. 2 shows a flow chart of the operation of the system of FIG. 1 in scanning a stream of mail pieces to accumulate records of postage amounts expended by particular postage meters.

FIG. 2 shows a flow chart of the operation of data processing system 40 in scanning a mail piece. At 110 system 40 inputs the next mail piece scan and at 112 tests to determine if the meter identification number is recognized; that is, is the meter identification number is legible and valid for this system. If the meter identification number is recognized then at 114-system 40 checks to determine if that number is included in the meter inspection file. If the number is not in meter inspection file 80 then at 116 system 40 tests to determine if the postage amount is recognized as a valid amount; that is, is valid for that class of mail and is legible. If the postage amount and meter identification number are recognized then at 120 the expenditure record for the identified meter is incremented.

If either the meter identification number or the postage amount are not recognized, or if the identified meter is included in meter inspection file 80, then at 122 system 40 diverts mail piece MP by asserting a control signal to activate diverter mechanism 30 on output 82.

At 124 system 40 tests to determine if mail piece MP is the last and if not returns to 110. Otherwise, system 140 exits.

Figure 3:
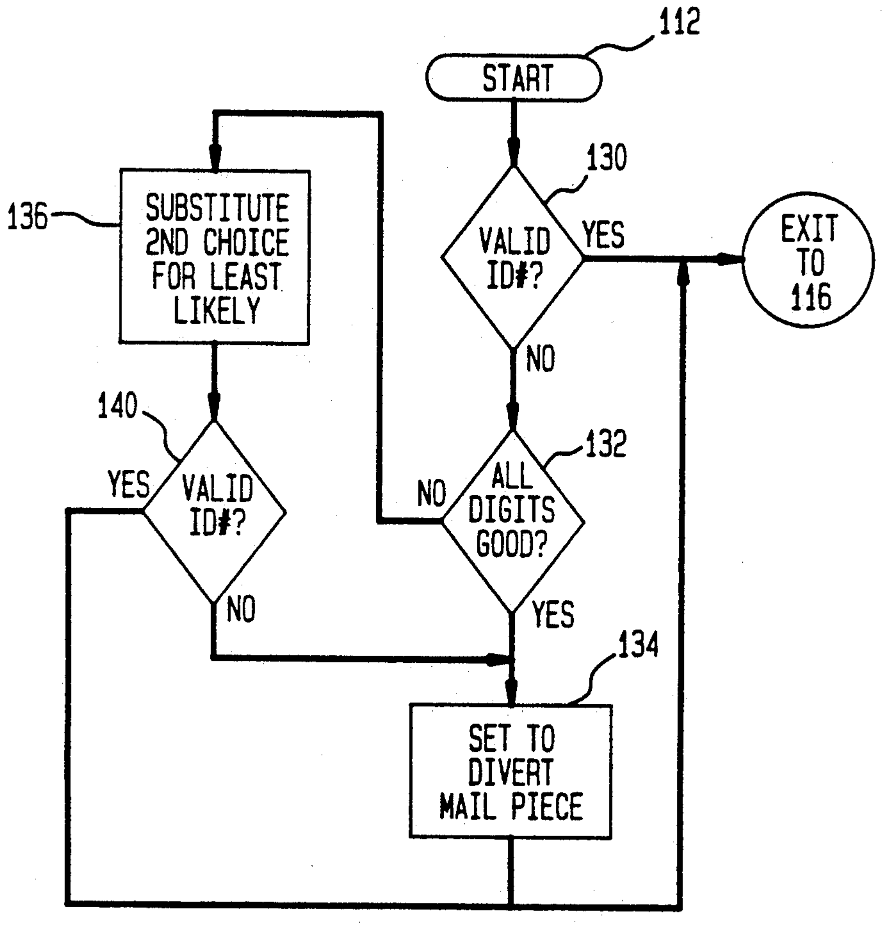
FIG. 3 shows a more detailed flow chart of one step of the flow chart of FIG. 1 where a meter identification number is recognized.

FIG. 3 shows a flow chart of the operation of system 40 in executing step 112 to recognize the meter identification number. Recall that OCR system 20 outputs a first and second choice of value for each digit of the meter identification number together with an estimate of likelihood for each choice. In FIG. 3 it is assumed that routine 60 tested legibility by determining that the likelihood for the most likely value for each digit was above a predetermined minimum level. Otherwise, system 40 assumes that at least 1 digit is completely unrecognizable and the meter identification number is illegible. Then at 130 system 40 tests to determine if the meter identification number is a valid identification number for the system. As was noted above the Domestic Mail Manual requires that mail metered by a particular postage meter be delivered to a particular, designated post office for handling. Thus, for each post office and each system only a limited subset of meter identification numbers will be valid. If the meter identification number is valid the routine exits to step 116 in FIG. 2.

If the meter number is not valid then at step 132 system 40 tests to determine if all digits are good; that is, if all digits are below the maximum level of likelihood at which it may be assumed that there is any doubt as to the value of the digit. If all digits are good then at step 134 system 40 sets conditions to divert mail piece MP at 122 in FIG. 2.

If at 132 system 40 determines that at least some digits of the meter identification number are doubtful, then at 136 system 40 substitutes the second choice of value for the digit first choice value identified as least likely. Then at 140 system 40 again tests the modified meter identification number to determine if it is a valid identification number. If it is then system 40 exits to step 116 in FIG. 2, and if it is not system 40 goes to step 134 to set to divert mail piece MP as described above.

Thus, it can seen that step 112 of FIG. 2 takes advantage of the limited set of meter identification number of values that will be valid for a particular post office. For example, for a particular meter identification number, if the identified values were 1, 2, 3, 4, 5, and if the first choice of the fourth digit were 4 with a 51% likelihood, and the second choice were 9 with a 48% likelihood (implying some other value with a it 1% likelihood) then the routine shows in FIG. 3 would recognize the meter identification number as 12395 if that were valid for the system and 12345 were not. Conversely, if the digits of the meter identification number were recognized as 1, 2, 3, 4, 5, with all digits being greater than, for example, 95% likelihood then the routine shows in FIG. 3 would not recognize the meter identification number as valid for the system.

Those skilled in the art will recognize that many other routines to utilize the information in valid meter file 66 can be developed. For example, system 40 could try different values for more then one digit, could change pairs of digits or even triplets of digits, or step 132 could be omitted and system 140 could always change the least likely digit each time the meter identification number was not recognized as valid. Further, with other modes of operation of OCR system 20 other routines to utilize the information in file 66 would be needed. Accordingly, the exact form of the routine of FIG. 3 forms no part of the invention per se., though the form shown in FIG. 3 is preferred.

Figure 4:
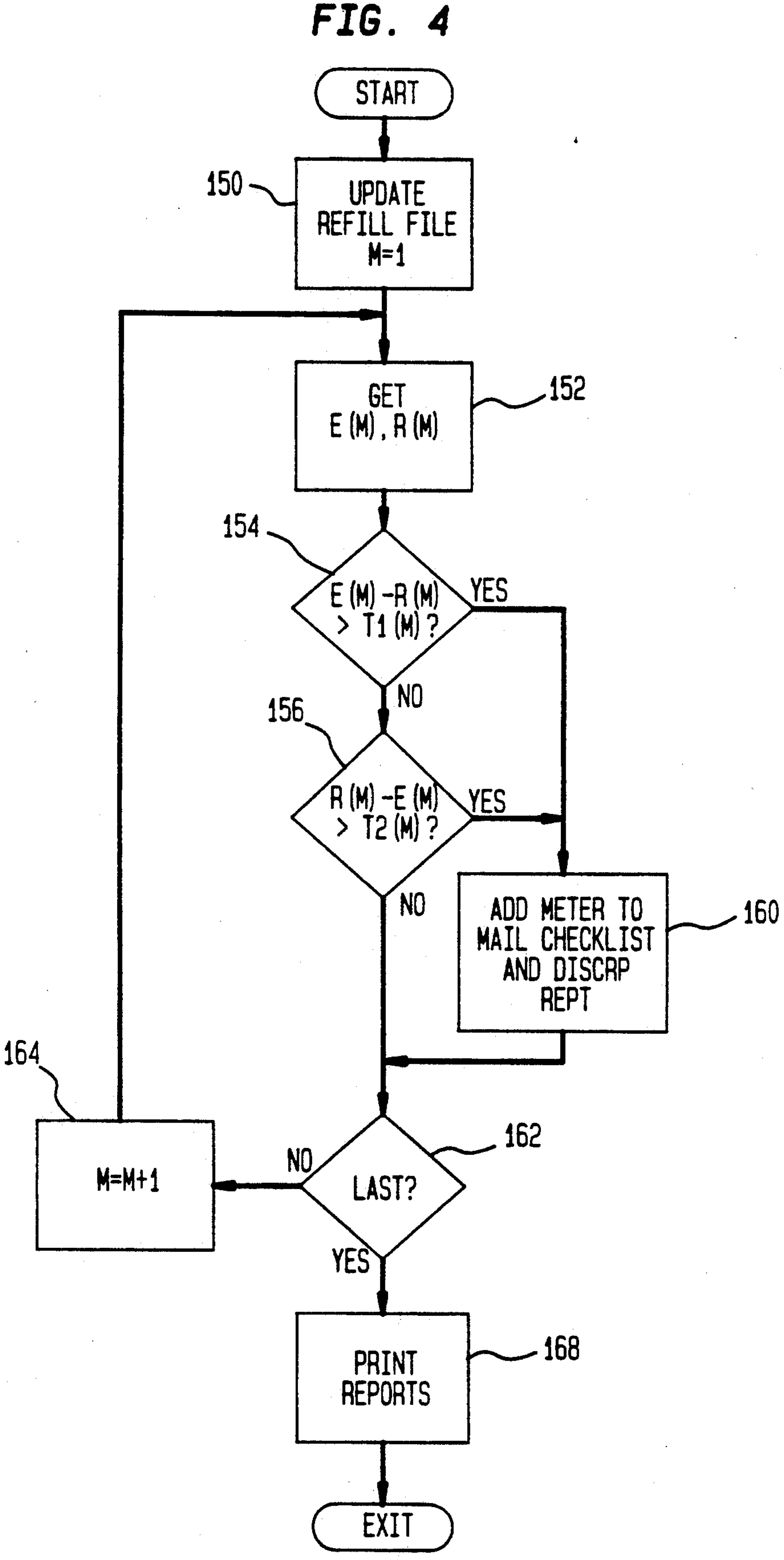
FIG. 4 shows a flow chart of the operation of the system of FIG. 1 in generating discrepancy reports.

FIG. 4 shows a flow chart of the operation of data processing system 40 in generating reports 54 and 58. In FIG. 4 it is assumed that reports are generated each time refill file 94 is updated though, as noted above, that these reports may be initiated by operator request and/or a predetermined schedule is within the contemplation of the subject invention.

At 150 system 40 updates refill file 94 and sets M equal to one. Then at 152 system 40 gets the record of accumulated expenditures for the Mth meter in valid meter file 66, E(M), and gets the corresponding refill record R(M) from refill file 94.

Then at 154 system 40 checks to determine if the difference between E(M) and R(M) is greater then a first threshold T1(M). If so, this indicates the possibility that mail pieces imprinted with counterfeit indicia have been processed through the system.

Otherwise, at 156 system 40 tests to determine if R(M) minus E(M) is greater then a second threshold T2(M). If so this indicates the possibility that mail pieces processed by the Mth meter are being improperly processed, as for example by being delivered to the wrong post office.

If at either 154 or 156 the appropriate threshold is exceeded then at 160 the Mth meter is added to the discrepancy report. Preferably system 40 will also add the Mth meter to meter inspection file 80 so that the system may immediately begin diverting mail pieces bearing this meter identification number. Alternatively, the meter identification number for the Mth meter may be input through input 52 after an operator has reviewed the discrepancy report.

At 162 system 40 test to determine if this is the last meter and if not, at 164 sets M equal to M+1 and returns to 152 to process the next meter.

After the last meter is processed then at 168 system 40 prints expenditure report 54 and discrepancies report 58 and exits.

It is also within the contemplation of the subject invention to identify and divert mail pieces which have an incorrect date since the Domestic Mail. Manual requires that postal indicia include the date the mail piece is meter and that the mail piece be deposited on that date.

The examples set forth above have been given by way of illustration only, and those skilled in the arts will recognize numerous other embodiments of the subject invention from the detailed description set forth above and the attach drawings. Accordingly, limitations on the subject invention are to be found only in the claims set forth below.

What is claimed is:

1. A system for analysis of postage meter usage, comprising:
   a. means for scanning a postal indicia imprinted on a mail piece to recognize a postage amount and meter identification number identifying a meter which has expended said postage amounts;
   b. means, responsive to said scanning means, for storing a cumulative record of postage amounts expended by said meter;
   c. second means for storing a cumulative record of refills for said meter;
   d. means for comparing said postage amounts record with said refill record and;
   e. means, responsive to said first comparing means for generating a report identifying said meter if a discrepancy exists between said postage amount record and said refill record.

2. A system as described in claim 1 wherein said report generating means generates a report indicting a likelihood that of meter fraud if the difference between said postage amounts record and said refill record is greater than a meter fraud threshold value.

3. A system as described in claims 1 or 2 wherein said report generating'means generates a report indicating a likelihood of improper use of said meter if the difference between said refill record and said postage amounts record is greater than an improper threshold value.

4. A system as described in claim 3 wherein at least one of said thresholds is at least partially determined as a function the intended use of said meter.

5. A system as described in claim 3 wherein at least one of said thresholds is at least partially determined as a function of the type of said meter.

6. A system as described in claim 3 wherein at least one of said thresholds is at least partially determined as a function of time.

7. A system as described in claim 3 wherein at least one of said thresholds is at least partially determined as a function of the usage history of said meter.

8. A system as described in claim 3, further comprising:
   a. means for diverting said mail piece for inspection;
   b. means for storing a file of valid meter identification numbers;
   c. second comparing, means, responsive to said scanning means for comparing said recognized meter identification number with said valid numbers; and
   d. means, responsive to said second comparing means, for controlling said diverting means to divert said mail piece if said meter identification number is not equal to one of said valid numbers.

9. A system as described in claim 3, further comprising:
   a. means for diverting said mail piece for inspection;
   b. means for storing a file of meter identification numbers requiring inspection;
   c. third comparing means, responsive to said scanning means for, comparing said recognized meter identification number with said number requiring inspection; and,
   d. means, responsive to said third comparing means, for controlling said diverting means to divert said mail piece if said recognized meter identification number is equal to one of said numbers requiring inspection.

10. A system as described in claim 9 further comprising means responsive to said first comparing means for adding said recognized meter identification number to said file of numbers requiring inspection if the difference between said postage amounts record and said refill record is greater than said meter fraud threshold value.

11. A system as described in claim 10 further comprising means response to said first comparing means for adding said recognize meter identification number to said file of numbers requiring inspection if the difference between said refill record an said postage amounts record is greater than said improper use threshold value.

12. A system as described in claim 3 further comprising:
   a. means for diverting said mail piece for inspection;

b. means for determining legibility of said recognized meter identification number and said postage amount; and, c. means, responsive to said legibility determining means, for controlling said diverting means to divert said mail piece if said recognized meter identification number is not legible.

13. A system as described in claim 3, further comprising:

a. means for diverting said mail piece for inspection;

b. means for storing a file of valid amounts;

c. fourth comparing means, responsive to said scanning means, for comparing said postage amount with said valid amounts and; and d. means, responsive to said second comparing means, for controlling said diverting means to divert said mail piece if said postage amount is not equal to one of said valid amounts.

14. A system as described in claim 3, further comprising:

a) means for diverting said mail pieces for inspection:

b) means for determining if said indicia includes a valid date; and, c) means, responsive to said void date determining means, for controlling said diverting means to divert said mail piece if said date is not valid.

15. A system as described in claim 1, further comprising:

a. means for diverting said mail piece for inspection;

b. means for storing a file of valid meter identification numbers;

c. second comparing, means, responsive to said scanning means for comparing said recognized meter identification number with said valid numbers; and d. means, responsive to said second comparing means, for controlling said diverting means to divert said mail piece if said meter identification number is not equal to one of said valid numbers.

16. A system as described in 1, further comprising:

a. means for diverting said mail piece for inspection;

b. means for storing a file of meter identification numbers requiring inspection;

third comparing means, responsive to said scanning means for, comparing said recognized meter identification number with said numbers requiring inspection; and, d. means, responsive to said third comparing means, for controlling said diverting means to divert said mail piece said recognized meter identification number is equal to one of said numbers requiring inspection.

17. A system as described in claim 1 further comprising:

a. means for diverting said mail piece for inspection;

b. means for determining legibility of said recognized meter identification number and said postage amount, and, c. means, responsive to said legibility determining means, for controlling said diverting means to divert said mail piece if said recognized meter identification number is not legible.

18. A system as described in claim 1, further comprising:

a. means for diverting said mail piece for inspection;

b. means for storing a file of valid amounts;

c. fourth comparing means, responsive to said scanning means, for comparing said postage amount with said valid amounts and; and d. means, responsive to said second comparing means, for controlling said diverting ? deans to divert said mail piece if said postage amount is not equal to one of said valid amounts.

* * * * *